(12) United States Patent
Garrison et al.

(10) Patent No.: US 10,334,315 B2
(45) Date of Patent: Jun. 25, 2019

(54) SYSTEM AND METHOD FOR VIDEO MOSAIC

(71) Applicant: ARRIS Enterprises, Inc., Suwanee, GA (US)

(72) Inventors: William J. Garrison, Warminster, PA (US); Albert F. Elcock, West Chester, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/862,251

(22) Filed: Sep. 23, 2015

(65) Prior Publication Data
US 2017/0085947 A1    Mar. 23, 2017

(51) Int. Cl.
| | |
|---|---|
| *H04N 21/44* | (2011.01) |
| *H04N 5/265* | (2006.01) |
| *H04N 21/431* | (2011.01) |
| *H04N 21/433* | (2011.01) |
| *H04N 21/4545* | (2011.01) |
| *H04N 21/462* | (2011.01) |
| *H04N 21/482* | (2011.01) |
| *H04N 21/81* | (2011.01) |

(52) U.S. Cl.
CPC ....... *H04N 21/44016* (2013.01); *H04N 5/265* (2013.01); *H04N 21/4314* (2013.01); *H04N 21/4331* (2013.01); *H04N 21/45457* (2013.01); *H04N 21/4622* (2013.01); *H04N 21/4821* (2013.01); *H04N 21/812* (2013.01); *H04N 21/8133* (2013.01)

(58) Field of Classification Search
CPC .................. H04N 21/44016; H04N 5/265
See application file for complete search history.

(56) References Cited

U.S. PATENT DOCUMENTS

| | | | |
|---|---|---|---|
| 7,319,806 B1 * | 1/2008 | Willner | G11B 27/034 386/241 |
| 8,132,208 B2 | 3/2012 | Gonzalez | |
| 2003/0014752 A1 | 1/2003 | Zaslaysky et al. | |
| 2003/0121037 A1 | 6/2003 | Swix et al. | |

(Continued)

FOREIGN PATENT DOCUMENTS

| | | |
|---|---|---|
| EP | 2373038 A1 | 10/2011 |
| EP | 2629546 A1 | 8/2013 |

(Continued)

OTHER PUBLICATIONS

Lawler, R., "Cablevision lets viewers watch 9 channels at once with new iOTV Quick Views", enGadget.com, AOL, Inc., Mar. 24, 2011 at http://www.engadget.com/2011/03/24/cablevision-lets-viewers-watch-9-channels-at-once-with-new-io-tv/.

(Continued)

*Primary Examiner* — Chenea Davis
*Assistant Examiner* — Chenea Smith
(74) *Attorney, Agent, or Firm* — Thomas A. Ward

(57) ABSTRACT

A system and method is provided that enables a viewer to view all the available content on a mosaic display, even when advertisements would otherwise prevent a viewer from doing so. Whenever a channel is displaying non-program content, the mosaic may instead display pre-recorded content for the current program on that channel prior to the ad-period.

16 Claims, 11 Drawing Sheets

(56) References Cited

U.S. PATENT DOCUMENTS

| | | | |
|---|---|---|---|
| 2005/0204383 A1 | 9/2005 | Boulanger | |
| 2007/0011702 A1 | 1/2007 | Vaysman | |
| 2009/0037948 A1* | 2/2009 | Hostyn | H04N 7/163 725/32 |
| 2009/0133053 A1* | 5/2009 | Badt, Jr. | H04N 7/17318 725/32 |
| 2014/0208356 A1 | 7/2014 | McCarthy et al. | |
| 2015/0082349 A1* | 3/2015 | Ishtiaq | H04N 21/23418 725/40 |

FOREIGN PATENT DOCUMENTS

| | | |
|---|---|---|
| GB | 2365649 A | 2/2002 |
| WO | 2004056098 A1 | 7/2004 |
| WO | 2006081577 A2 | 8/2006 |
| WO | 2008/024420 A2 | 2/2008 |

OTHER PUBLICATIONS

PCT Search Report & Written Opinion, RE: Application No. PCT/US2016/046247, dated Nov. 14, 2016.

\* cited by examiner

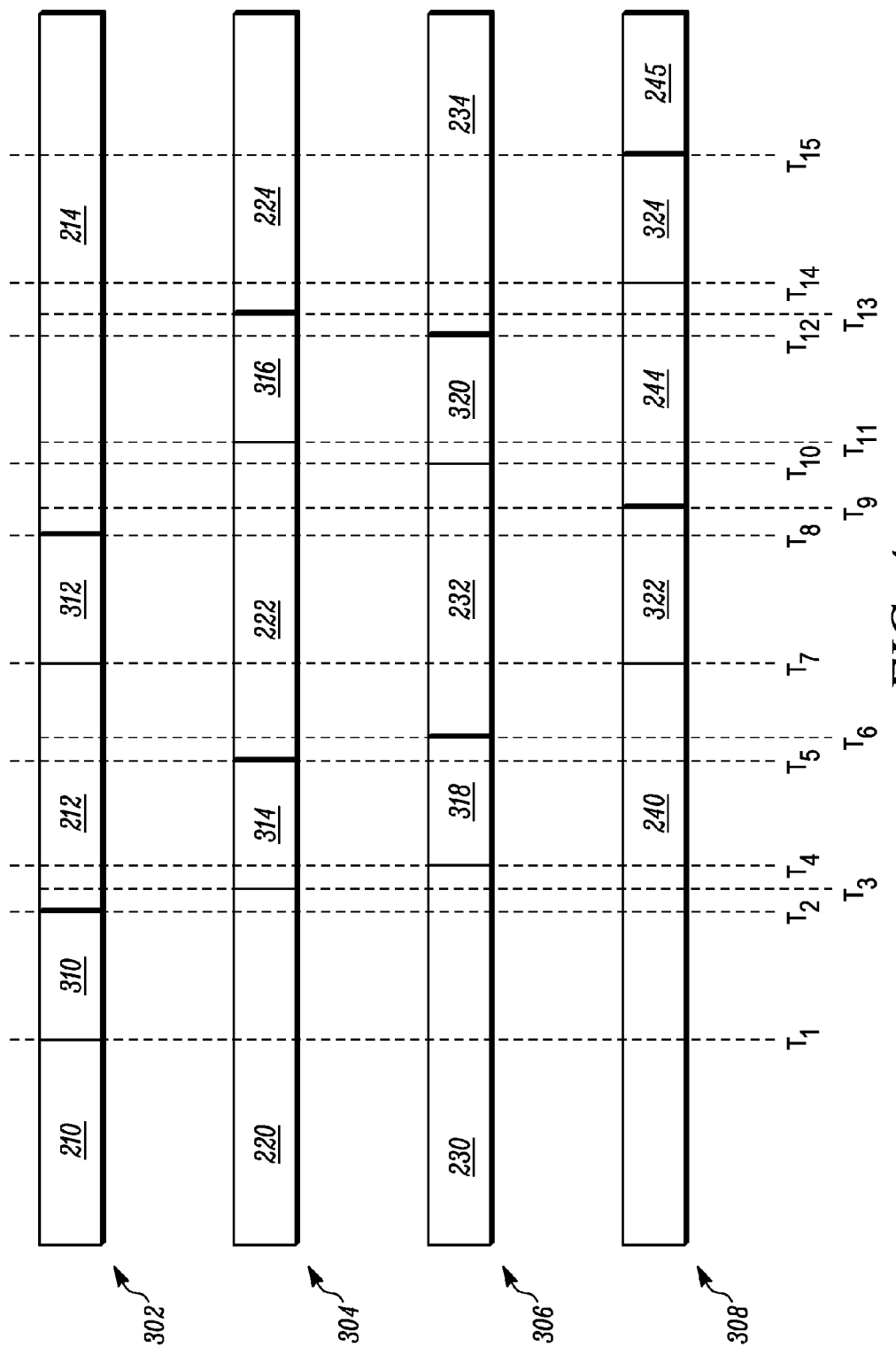

SYSTEM AND METHOD FOR VIDEO MOSAIC

BACKGROUND

Embodiments of the invention relate to devices and methods to display a plurality of different contents at the same time.

Conventional mosaic displays provided by content providers give the viewer the opportunity to view multiple channels of content at the same time in order to determine which channel the viewer will ultimately choose to watch. A mosaic display may include different channels within the same category, i.e., one mosaic display may include popular news content, while a different mosaic display may include popular sports content. Mosaic displays may also include user defined channel choices to display content of various categories at the same time.

Such mosaic displays, while generally useful to a viewer, sometimes show non-program content (non-limiting examples of which include advertisements and promotional segments) instead of the content, making it difficult for the viewer to know what content is actually available to choose.

FIG. 1A illustrates a conventional content mosaic.

As shown in the figure, system 100 includes a content provider group 102, an advertisement provider group 104, and a residence 106.

Content provider group 102 includes content providers 108, 110, 112 and 114. Content providers 108, 110, 112 and 114 may include any content provider, non-limiting examples of which include cable providers, satellite providers, and broad castors, and they serve to provide content the viewer desires to watch, like a sitcom or a sporting event. Here, content providers 108, 110, 112 and 114 are illustrated as distinct elements. For example, each may be a distinct television network broadcast station. However, two or more of content providers 108, 110, 112 and 114 may be combined as a unitary element, for example a cable television provider that multiple distinct television network content.

Advertisement provider group 104 includes advertisement providers 116, 118, 120, 122, 124 and 126. Advertisement providers 116, 118, 120, 122, 124 and 126 may include any advertisement provider that creates advertisements, and advertisement providers 116, 118, 120, 122, 124 and 126 serve to provide the advertisements that fill in predetermined gaps in the desired content. Here, advertisement providers 116, 118, 120, 122, 124 and 126 are illustrated as distinct elements. For example, each may be a distinct television network advertisement provider that provides specific commercials. However, two or more of advertisement providers 116, 118, 120, 122, 124 and 126 may be combined as a unitary element.

It should also be noted that it is conceivable for a content provider group to be combined with an advertisement group, wherein a single group provides both the content and the advertisements.

Residence 106 includes receiver 128 and video display 130.

Content provider group 102 is in communication with receiver 128 via a communication channel 101. In some cases, where advertisement provider group 104 and content provider group 102 are not a single element, advertisement provider group 104 is in communication with content provider group 102 via a communication channel 103. In some cases, where advertisement provider group 104 and content provider group 102 are not a single element, advertisement provider group 104 is in communication with receiver 128 via a communication channel 105.

Communication channel 101, communication channel 103 and communication channel 105 may be any known type of wired or wireless communication channel that is able to transfer data.

Receiver 128 is operable to receive content from content providers 108, 110, 112 and 114 via communication channel 101 and to receive advertisements from advertisement providers 116, 118, 120, 122, 124 and 126 via communication channel 105. In the case where content providers 108, 110, 112 and 114 are distinct elements, receiver 128 receives content from a single provider from content providers 102. In the case were content providers 108, 110, 112 and 114 are a unitary element, receiver 128 is able to receive content from a plurality of providers from content provider group 102.

Similarly, receiver 128 may receive advertisements from a single provider from advertisement provider group 104 or from a plurality of providers from advertisement provider group 104.

In some cases, receiver 128 packages the content and advertisements together such that transitions between them are seamless, and then relays the packaged content and advertisements to the viewer via video display 130. In other cases, content provider group 102 may receive the advertisements from advertisement provider group 104 via communication channel 103 and package them with the content before the content reaches receiver 128 via communication channel 101. In still other cases, advertisement provider group 104 may receive the content from content provider group 102 via communication channel 103 and package them with the advertisements before reaching receiver 128 via communication channel 105. In yet still other cases, any one of content providers 108, 110, 112 and 114 and advertisement providers 116, 118, 120, 122, 124 and 126 may a single provider such that a single provider provides both content and advertisements to receiver 128.

To simplify the discussion, in an example situation, content provider group 102 provides content to receiver 128 and advertisement provider group 104 provides advertisements to receiver 128.

FIG. 1B illustrates a conventional mosaic display.

As shown in the figure, video display 130 includes a mosaic display 132 and images 134, 136, 138 and 140. Images 134, 136, 138 and 140 are each video images of content associated with a particular communication channel. When a viewer wants to see the content available on different channels at the same time, he issues an instruction to receiver 128 (for example, via a remote control, not shown) to tune to the desired mosaic display. The receiver then displays mosaic display 132 on video display 130, which shows the viewer the available content associated with particular channels via video images 134, 136, 138 and 140.

For purposes of discussion, presume that after the viewer sees all the available content on mosaic display 132, he decides to watch the content associated with video image 134. In such a case, uses the remote control (not shown) to select the content associated with video image 134. The receiver then switches from mosaic display 132 to a channel providing the content associated with video image 134. This will be described with reference to FIG. 1C.

FIG. 1C illustrates a video display after an image is selected from a mosaic display.

As shown in the figure, video display 116 includes image 142. In this example, receiver 128 has switched from mosaic display 132 to image 142, which is the content associate with the viewer's selection of video image 134 on mosaic display 132.

A problem with this type of mosaic is best described with reference to the streams of video data associated with the video images of the mosaic. This will be described with reference to FIG. 2.

FIG. 2 illustrates streams of video data.

The figure includes a video data stream 202 corresponding to first content (e.g., a television program), a video data stream 204 corresponding to second content, a video data stream 206 corresponding to third content and a video data stream 208 corresponding to fourth content.

Video data stream 202 includes an initial portion of content 210, a middle portion of content 212, a later portion of content 214, a non-program content indicator 216 and a non-program content indicator 218. Video data stream 204 includes an initial portion of content 220, a middle portion of content 222, a later portion of content 224, a non-program content indicator 226, and a non-program content indicator 228. Video data stream 206 includes an initial portion of content 230, a middle portion of content 232, a later portion of content 234, a non-program content indicator 236, and a non-program content indicator 238. Video data stream 208 includes an initial portion of content 240, a middle portion of content 244, a later portion of content 234, a non-program content indicator 248 and a non-program content indicator 260.

In this example, each video data stream includes two non-program content indicators separating three portions of content. It should be noted that this provided merely for purposes of discussion and that more or less non-program content indicators may be provided in a single video data stream. It should further be noted that, as known to those of skill in the art, the non-program content indicators include a "begin" indicator and an "end" indicator, wherein the begin indicator instructs a receiver as to where the non-program content insert will begin and the end indicator instructs a receiver as to where the non-program content insert will end.

Video data stream 202, video data stream 204, video data stream 206, and video data stream 208 are each associated with respective video content provided. For example, video data stream 202 may be associated with the content provided by a first television network provider, and video data stream 204 may be associated with the content provided by a second television network provider.

All initial, middle, and later portions of the content in video data stream 202, video data stream 204, video data stream 206, and video data stream 208 include the substantive content the user desires to see in order to choose which channel to watch.

Non-program content indicators 216, 218, 226, 228, 236, 238, 248, and 250 serve to notify receiver 128 that advertisements should be inserted and displayed on the video display. For example, when receiver 128 is notified that initial portion of content 210 reaches non-program content indicator 216, receiver 128 displays advertisements provided by the advertisement providers. In some cases, when receiver 128 is notified that initial portion of content 210 reaches non-program content indicator 216, receiver 128 inserts advertisements provided by the content provider.

Whether the content providers insert the advertisements into the content prior to sending the packaged content and advertisements to receiver 128, whether the advertisement providers insert the advertisements into the content prior to sending the packaged content and advertisements to receiver 128, or whether receiver 128 inserts the received advertisements into the received content, once the advertisements are packaged with the content, a new data stream is created. This will be described with reference to FIG. 3.

FIG. 3 illustrates video data streams with advertisements.

The figure includes a video data stream 302 corresponding to first content (e.g., a television program) with advertisements therein (e.g., commercials), a video data stream 304 corresponding to second content with advertisements therein, a video data stream 306 corresponding to third content with advertisements therein and a video data stream 308 corresponding to fourth content with advertisements therein.

As shown in the figure, video data stream 302 includes an advertisement 310 at non-program content indicator 216 and an advertisement 312 at non-program content indicator 218. Video data stream 304 includes an advertisement 314 at non-program content indicator 226 and an advertisement 316 at non-program content indicator 228. Video data stream 306 includes an advertisement 318 at non-program content indicator 236 and an advertisement 320 at non-program content indicator 238. Video data stream 308 includes an advertisement 322 at non-program content indicator 248 and an advertisement 324 at non-program content indicator 260.

As described with additional reference to FIG. 2, and using video data stream 302 as a non-limiting example, a viewer may be watching initial portion of content 210. When the end of initial portion of content 210 is reached, non-program content indicator 216 notifies receiver 128 that it is time to insert an advertisement in between initial portion of content 210 and middle portion of content 212. Receiver 128 proceeds to insert advertisement 310 in between initial portion of content 210 and middle portion of content 212. When advertisement 310 is complete, receiver 128 plays middle portion of content 212. When the end of middle portion of content 212 is reached, non-program content indicator 218 notifies receiver 128 that it is time to insert an advertisement in between middle portion of content 212 and later portion of content 214. Receiver 128 proceeds to insert advertisement 312 in between middle portion of content 212 and later portion of content 214. When advertisement 312 is complete, receiver 128 plays later portion of content 214.

Problems arise in conventional mosaic displays, however, when the user desires to see all the available content simultaneously, but instead sees the advertisements. This issue will be discussed with reference to FIG. 4.

FIG. 4 illustrates channels of video data stream displayed on a mosaic display.

In operation, at time $t_1$ a viewer may tune to a mosaic display that displays video data stream 302, video data stream 304, video data stream 306, and video data stream 308. Time $t_1$ corresponds to the end of the initial portion of content 210 and the beginning of advertisement 310 on video data stream 202. At time $t_1$, initial portion of content 220, initial portion of content 230, and initial portion of content 240 will be shown on the mosaic display. Therefore, when the viewer tunes to the mosaic display at time $t_1$, he will only see the desired content associated with three of the four channels, and will not have enough information to make a decision regarding which channel to select.

Time $t_2$ corresponds to the end of advertisement 310, so from time $t_2$ to $t_3$ the viewer would see middle portion of content 212, initial portion of content 220, initial portion of content 230, and initial portion of content 240. At time $t_3$, however, advertisement 314 begins, and the viewer again will only see the desired content associated with three of the four channels. At time $t_4$, advertisement 318 begins while advertisement 314 is ongoing, so the viewer would only see the desired content associated with two of the four channels (the middle portion of content 212 the initial portion of content 240).

At time $t_5$, advertisement 314 ends while advertisement 318 is still ongoing, so the viewer again would only see the desired content associated with three of the four channels. At time $t_6$, advertisement 318 ends, and the viewer would be able to see content associated with all four channels. The time during which content associated with all four channels is viewable on the mosaic display is short lived, though, because at time $t_7$, advertisement 312 and advertisement 322 are underway, and the viewer can only view the desired content associated with two of the four channels.

At time $t_8$, advertisement 312 ends while advertisement 322 is still ongoing, leaving the viewer to see content associated with three of the four channels. At time $t_9$, advertisement 322 ends, and from $t_9$ to $t_m$ the viewer can see content associated with all four channels. At time $t_6$, advertisement 320 begins, and at $t_{11}$, advertisement 316 begins, so from $t_{11}$ to $t_{12}$ (when advertisement 320 ends) the viewer can only see content associated with two of the four channels. At $t_{13}$, advertisement 316 ends, and from $t_{13}$ to $t_{14}$ the viewer can see content associated with all four channels. However, at $t_{14}$ advertisement 324 starts, and from $t_{14}$ to $t_{15}$ (when advertisement 324 ends) the viewer can only see content associated with three of the four channels. This will be further described with reference to FIGS. 5A-C.

FIGS. 5A-C illustrate conventional mosaic displays at three different time, respectively, wherein FIG. 5A illustrates mosaic display 132 prior to time $t_1$ as illustrated in FIG. 4, FIG. 5B illustrates mosaic display 132 between times $t_1$ and $t_2$ as illustrated in FIG. 4 and FIG. 5C illustrates mosaic display 132 between times $t_4$ and $t_5$ as illustrated in FIG. 4.

As shown in FIG. 5A, video display 130 is currently showing mosaic display 132 for a time prior to time $t_1$. During this period, mosaic display 132 includes a video image 502, a video image 504, a video image 506 and a video image 508. In this example, with additional reference to FIG. 4, video image 502 corresponds to initial portion of content 210 of video data stream 302, video image 504 corresponds to initial portion of content 220 of video data stream 304, video image 506 corresponds to initial portion of content 230 of video data stream 306 and video image 508 corresponds to initial portion of content 240 of video data stream 308.

In other words, mosaic display 132, prior to time $t_1$, displays the actual content of the show on each of the channels. In this way, the viewer can easily see what is currently playing on each channel. However, this may change if an advertisement starts to play on one of the channels. This will be described with reference to FIGS. 5B-C.

As shown in FIG. 5B, video display 130 is currently showing mosaic display 132 for a time between times $t_1$ and $t_2$. During this period, mosaic display 132 includes a video image 510, video image 504, video image 506 and video image 508. In this example, with additional reference to FIG. 4, video image 510 corresponds to advertisement 310 of video data stream 302.

In other words, mosaic display 132, between times $t_1$ and $t_2$, displays the actual content of the show on three of the four of the channels, but additionally displays an advertisement on one of the channels. Accordingly, the viewer can only see what is currently playing on three of the four channels and might not know what is playing on the fourth channel, which is currently showing an advertisement.

As shown in FIG. 5C, video display 130 is currently showing mosaic display 132 for a time between times $t_4$ and $t_5$. During this period, mosaic display 132 includes video image 502, a video image 512, a video image 514 and video image 508. In this example, with additional reference to FIG. 4, video image 512 corresponds to advertisement 314 of video data stream 304 and video image 514 corresponds to advertisement 318 of video data stream 306.

In other words, mosaic display 132, between times $t_4$ and $t_5$, displays the actual content of the show on two of the four of the channels, but additionally displays advertisements on the remaining two channels. Accordingly, the viewer can only see what is currently playing on two of the four channels and might not know what is playing on the other two channels, which are each currently showing an advertisement.

In this example situation discussed above with reference to FIGS. 1A-5C, content provider group 102 provides content to receiver 128 and advertisement provider group 104 provides advertisements to receiver 128. It should be noted, that this is a non-limiting example, wherein in other examples, advertisement provider group 104 provides the advertisements to content provider group 102, which in turn then provides both the content and advertisements to receiver 128. In particular, in such cases, advertisement provider group 104 provides the advertisements to content provider group 102 via communication channel 103. Content provider group 102 then provides the content and advertisements to receiver 128 via communication channel 101. The remaining operations are then similarly described as discussed above with reference to FIGS. 2-5C.

It is apparent that the majority of the time a viewer watches a mosaic display, it is possible to view the desired content associated with each channel simultaneously for only very short time periods. It is therefore likely that when the viewer tunes to the mosaic display, he will not see the desired content associated with at least one of the video data stream streams displayed.

There exists a need for a system and method to provide a viewer with a way to view all the available content on a mosaic display, even when advertisements would otherwise prevent a viewer from doing so.

SUMMARY

The present invention is drawn to a system and method that enables a viewer to view all the available content on a mosaic display, even when advertisements would otherwise prevent a viewer from doing so.

Various embodiments described herein are drawn to a device for use with a video display operable to display a video. The device includes a receiver, a memory, a packaging component, an image processing component and an instruction receiver. The receiver receives first video data on a first channel and second video data on a second channel. The first video data includes an initial portion of first content, an initial first non-program content indicator, a middle portion of the first content, a later first non-program content indicator and a later portion of the first content. The second video data includes an initial portion of second content, an initial second non-program content indicator, a middle portion of the second content, a later second non-program content indicator and a later portion of the second content. The memory stores a first content insert associated with the first content and a second content insert associated with the second content. The packaging component generates a first content package and a second content package.

The first content package includes the initial portion of first content, the first content insert and the middle portion of the first content. The second content package includes the initial portion of second content, the second content insert and the middle portion of the second content. The image processing component outputs a mosaic signal to enable the video display to display a mosaic including a first image section having video associated with the first content package and a second image section having video associated with the second content package. The instruction receiver receives a tuning instruction. The packaging component further generates a primary first content package including the middle portion of the first content, an advertisement at the later first non-program content indicator and the later portion of the first content. The image processing component further outputs a primary first content signal in response to the tuning instruction to enable the video display to display a video associated with the middle portion of the first content, the advertisement and the later portion of the first content.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 4 illustrates streams of video data displayed on a mosaic display;

FIGS. 5A-C illustrate conventional mosaic displays at three different time, respectively, wherein FIG. 5A illustrates the conventional mosaic display prior to time $t_1$ as illustrated in FIG. 4, FIG. 5B illustrates the conventional mosaic display between times $t_1$ and $t_2$ as illustrated in FIG. 4 and FIG. 5C illustrates the conventional mosaic display between times $t_4$ and $t_5$ as illustrated in FIG. 4;

FIGS. 10A-C illustrate mosaic displays in accordance with aspects of the present invention at three different time, respectively, wherein FIG. 9A illustrates the conventional mosaic display prior to time $t_1$ as illustrated in FIG. 8, FIG. 9B illustrates the conventional mosaic display between times $t_1$ and $t_2$ as illustrated in FIG. 8 and FIG. 9C illustrates the conventional mosaic display between times $t_4$ and $t_5$ as illustrated in FIG. 8.

DETAILED DESCRIPTION

The present invention provides a system and method to allow a viewer to see relevant content on a mosaic display so the viewer can make a decision as to what channel he ultimately wants to watch. While watching the mosaic display, at the time any channel is supposed to show an advertisement, the mosaic display may show alternate content that notifies the user of the content currently being broadcast on that channel. When the user tunes to a specific channel from the mosaic display, the user will then see advertisements at the appropriate times.

The invention provides an improved content selection experience because, unlike a conventional mosaic display, the viewer is able to see all of the available content simultaneously instead of seeing some combination of content and advertisements. This provides the viewer with more information to make an informed viewing decision in less time than it would take while viewing a conventional mosaic display. Further, when the viewer chooses a particular channel to view from the choices in the mosaic display, and the display displays the chosen channel, the viewed content will now include the advertisements. In this manner, the advertisers will be able to have their advertisements viewed by the viewer when the content is watched outside of the mosaic display.

Aspects of the present invention will not be described with reference to FIGS. 5-8.

Figure 6:
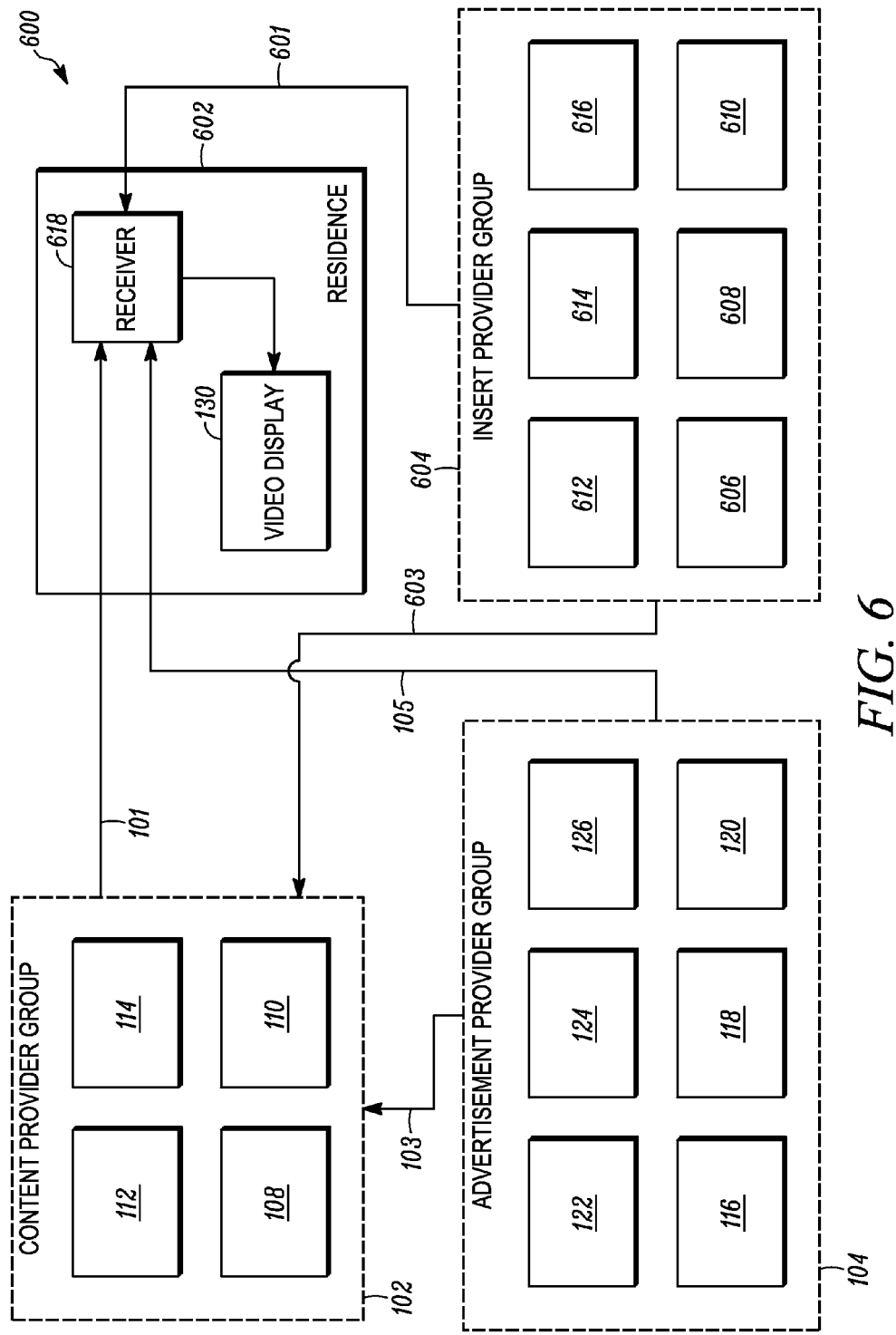
FIG. 6 illustrates a system for providing content to a viewer in accordance with aspects of the present invention.

FIG. 6 illustrates a system 600 for providing content to a viewer in accordance with aspects of the present invention.

As shown in the figure, system 600 includes content provider group 102, advertisement provider group 104, a residence 602 and an insert provider group 604.

Insert provider group 604 includes insert providers 606, 608, 610, 612, 614 and 616. Insert providers 606, 608, 610, 612, 614 and 616 may include any insert provider that creates inserts, and insert providers 606, 608, 610, 612, 614 and 616 serve to provide the inserts that fill in predetermined gaps in the desired content. In this embodiment, insert providers 606, 608, 610, 612, 614 and 616 are illustrated as distinct elements. However, in other embodiments two or more of insert providers 606, 608, 610, 612, 614 and 616 may be combined as a unitary element.

An insert is a form of content that is designed to show the viewer what content is playing on one channel that is shown as part of a mosaic display, even when an advertisement is supposed to be shown on that channel. As a non-limiting example, an insert may include previously broadcast content that corresponds to the content currently on the channel, recorded content from the current broadcast, or a promotional video for the content. If the channel is broadcasting an episode of a particular show, the insert may include a clip from the previous episode, or it may include a clip from an earlier time of the current episode. An insert enables a viewer to immediately recognize the content in a particular channel, without necessarily being the actual content.

Residence 106 includes receiver 618 and video display 130.

Content provider group 102 is in communication with receiver 618 via communication channel 101. In some cases, where advertisement provider group 104 and content provider group 102 are not a single element, advertisement provider group 104 is in communication with content provider group 102 via communication channel 103. In some cases, where advertisement provider group 104 and content provider group 102 are not a single element, advertisement provider group 104 is in communication with receiver 618 via communication channel 105. Insert provider group 604 is in communication with receiver 618 via a communication channel 601. In some cases, where insert provider group 604 and content provider group 102 are not a single element, insert provider group 604 is in communication with content provider group 102 via communication channel 601.

Communication channel 601 and communication channel 603 may be any known type of wired or wireless communication channel that is able to transfer data.

Receiver 618 is operable to receive content from content providers 108, 110, 112 and 114 via communication channel 101, to receive advertisements from advertisement providers 116, 118, 120, 122, 124 and 126 via communication channel 105 and to receive inserts from insert providers 606, 608, 610, 612, 614 and 616 via communication channel 601.

In some embodiments, receiver 618 packages the content, advertisements, and inserts together such that transitions between them are seamless, and then it relays the packaged content received to the viewer via video display 130. In alternate embodiments, content provider group 102 may receive the advertisements from advertisement group 104 via communication channel 103 and may receive inserts from insert provider group via communication channel 603, and then package them with the content before the content reaches receiver 128 via communication channel 101.

To simplify the discussion, in an example situation, content provider group 102 provides content to receiver 128 via communication channel 101, advertisement provider group 104 provides advertisements to receiver 128 via communication channel 105 and insert provider group 604 provides content to receiver 128 via communication channel 601.

The function and operation of inserts will be described in more detail with reference to FIGS. 6-8.

Figure 7:
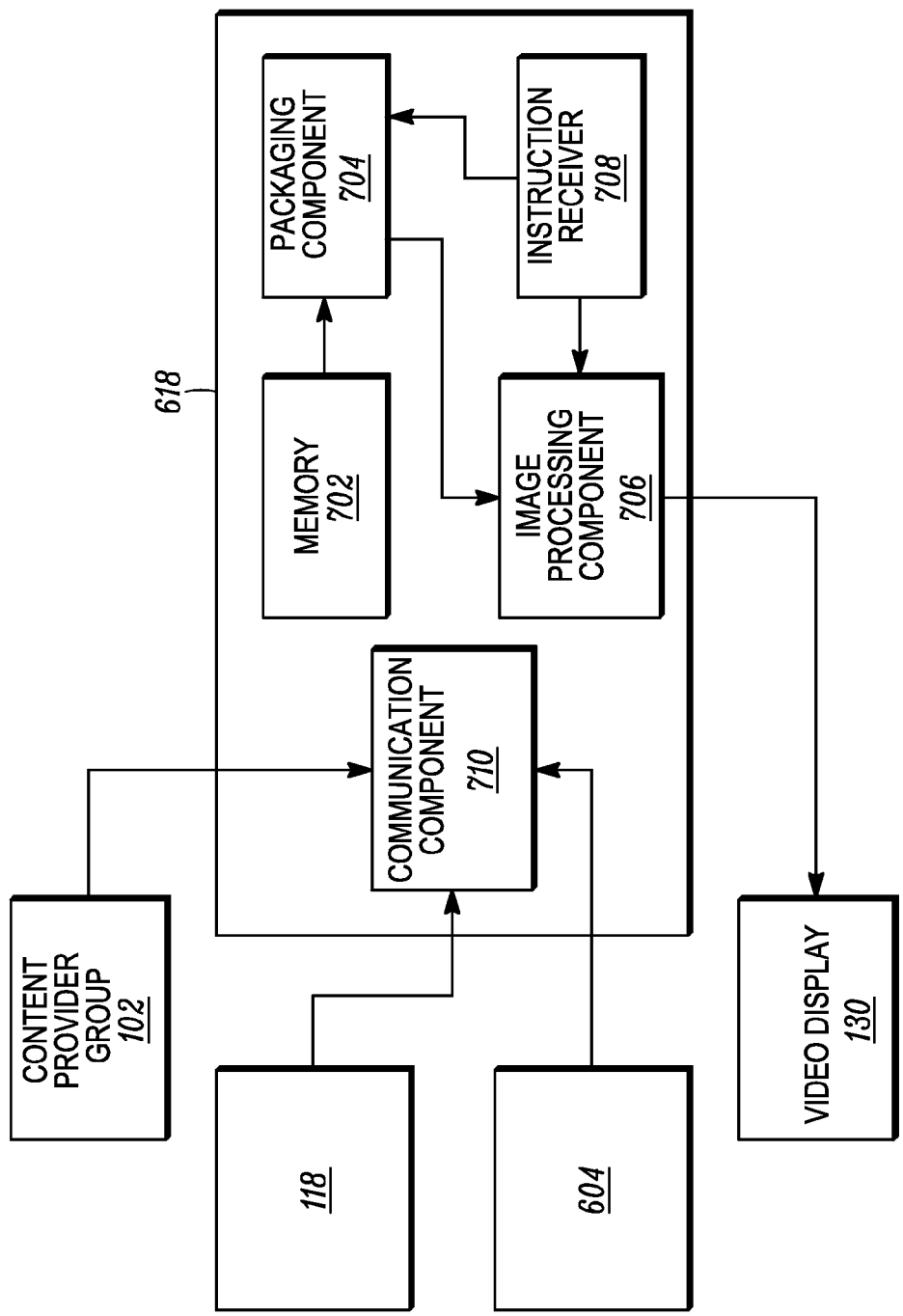
FIG. 7 illustrates a receiver in accordance with aspects of the present invention.

FIG. 7 illustrates an example of receiver 618 in accordance with aspects of the present invention.

As shown in the figure, receiver 618 includes a memory 702, a packaging component 704, an image processing component 706, an instruction receiver 708 and a communication component 710.

In this example, memory 702, packaging component 704, image processing component 706, instruction receiver 708 and communication component 710 are illustrated as individual devices. However, in some embodiments, at least two of memory 702, packaging component 704, image processing component 706, instruction receiver 708 and communication component 710 may be combined as a unitary device. Further, in some embodiments, at least one of memory 702, packaging component 704, image processing component 706, instruction receiver 708 and communication component 710 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, SD cards, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Communication component 610 is operable to receive content from content providers 102, advertisements from advertisement providers 104, and inserts from insert providers 604. Communication component 610 communicates with memory 702 and provides memory 702 with the content, advertisements, and inserts received from the respective providers. Communication component 610 may communicate with memory 702 by any known method, non-limiting examples of which include wired and wireless forms of communication.

Memory 702 is operable to receive and store content, advertisements, and inserts from communication component 610. Memory 702 communicates with packaging component 704 and provides packaging component 704 the stored content, advertisements, and inserts. Memory 702 may communicate with packaging component 704 by any known method, non-limiting examples of which include wired and wireless forms of communication. Memory 702 may be any device or system that is able to receive, store, retrieve and manage data, non-limiting examples of which include random access memory (RAM), static RAM (SRAM), dynamic RAM (DRAM), flash, disk, etc.

Packaging component 704 is operable to receive stored content and inserts from memory 702 and is further operable to create a content package that includes different combinations of the stored content, advertisements, and inserts. Packaging component 704 communicates with image processing component 706 to provide image processing component 706 with content packages. Packaging component 704 also communicates with instruction receiver 708 so that packaging component 704 can provide the correct package to image processing component 706. Packaging component 704 may communicate with image processing component 706 and with instruction receiver 708 by any known method, non-limiting examples of which include wired and wireless forms of communication. Packaging component 704 may be any system or device that is able to package bits into a data package that may be used by image processing component 706, a non-limiting example of which includes an encoder.

Image processing component 706 is operable to receive content packages from packaging component 704 and output the content packages to video display 130. Image processing component 706 is also operable to receive tuning instructions from instruction receiver 708 and output different content packages based on the tuning instructions received. Image processing component 706 may communicate with video display 130 and instruction receiver 708 by any known method, non-limiting examples of which include wired and wireless forms of communication.

Instruction receiver 708 is operable to receive tuning instructions from a viewer in any known manner, a non-limiting example of which includes via a remote control (not shown). Instruction receiver 708 communicates with image processing component 706 and provides image processing component 706 with the tuning instructions received from the viewer. Instruction receiver 708 also provides packaging component 704 information regarding the instructions from the viewer so that packaging component 704 can provide the correct package to image processing component 706.

The operation of receiver 618 will be further discussed with reference to FIGS. 8-10.

Figure 8:
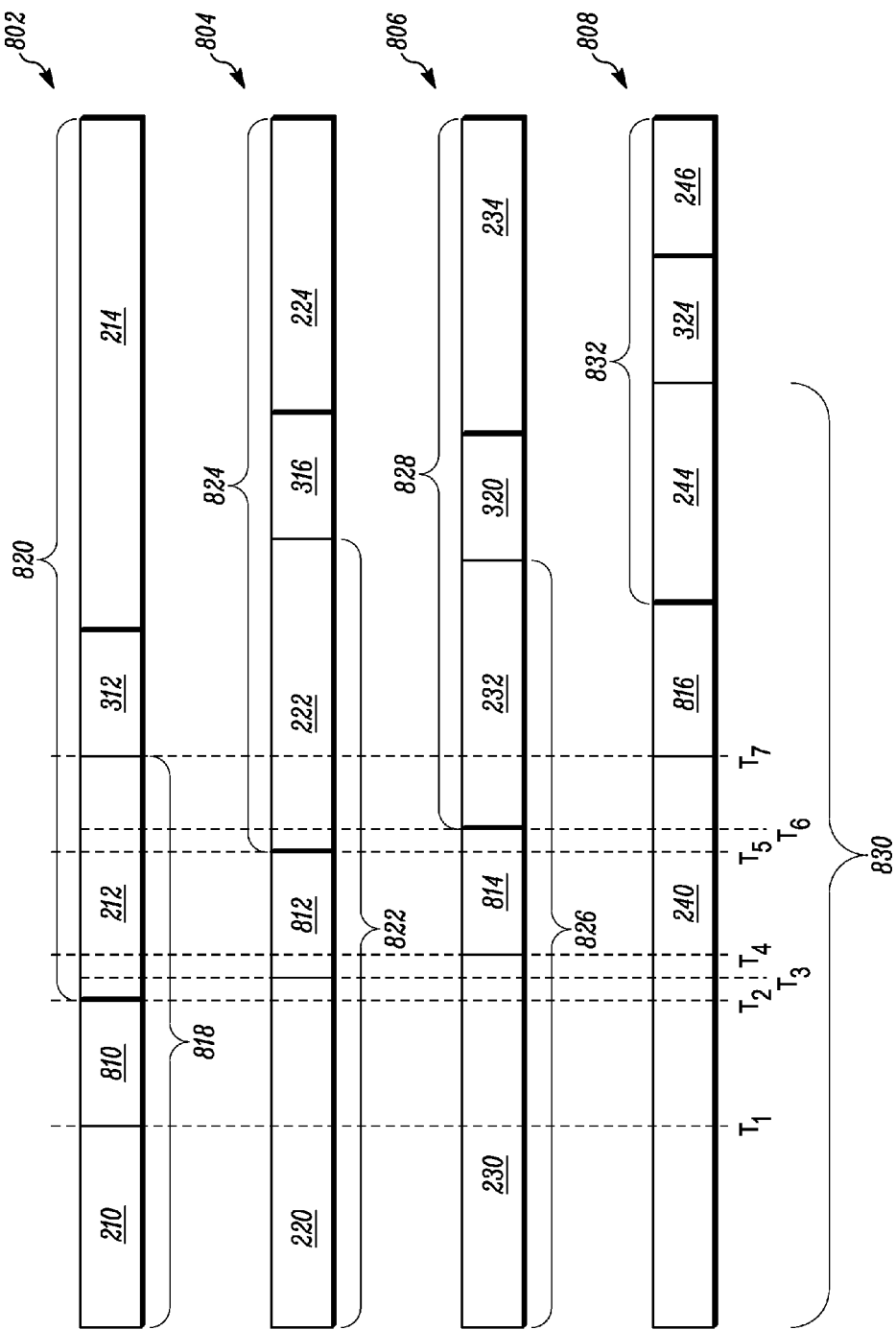
FIG. 8 illustrates video data streams for display on a mosaic in accordance with aspects of the present invention.

FIG. 8 illustrates video data streams for display on a mosaic in accordance with aspects of the present invention.

The figure includes a video data stream 802 corresponding to first content with an insert therein, a video data stream 804 corresponding to second content with advertisements therein, a video data stream 806 corresponding to third content with advertisements therein and a video data stream 808 corresponding to fourth content with advertisements therein.

Video data stream 802 includes a content package 818 and a content package 820. Content package 818 includes initial portion of content 210, an insert 810, and middle portion of content 212. Content package 812 includes middle portion of content 212, advertisement 312 and later portion of content 214.

Video data stream 804 includes a content package 822 and a content package 824. Content package 822 includes initial portion of content 220, an insert 812, and middle portion of content 222. Content package 824 includes middle portion of content 222, advertisement 316 and later portion of content 224.

Video data stream 806 includes a content package 826 and a content package 828. Content package 826 includes initial portion of content 230, an insert 814, and middle portion of content 232. Content package 828 includes middle portion of content 232, advertisement 320 and later portion of content 248.

Video data stream 808 includes a content package 830 and a content package 832. Content package 830 includes initial portion of content 240, an insert 816, and middle portion of content 244. Content package 832 includes middle portion of content 244, advertisement 324, and later portion of content 246.

The types of content packages described with respect to FIG. 8 are shown as non-limiting examples. Content packages may include more, or fewer, content segments than described above. For example, another content package for video data stream 808 may include initial portion of content 240, insert 816, middle portion of content 244, and an additional insert to replace advertisement 324. Yet another content package for video data stream on channel 808 may include only initial portion of content 240 and insert 816. In addition, content packages may include smaller segments of each portion. As another example, a content package for video data stream may include half of initial portion of content 230, insert 814, and half of middle portion of content 232.

A viewer's experience with a mosaic display in accordance with aspects of the present invention will be further described with reference to FIG. 9.

Figure 9:
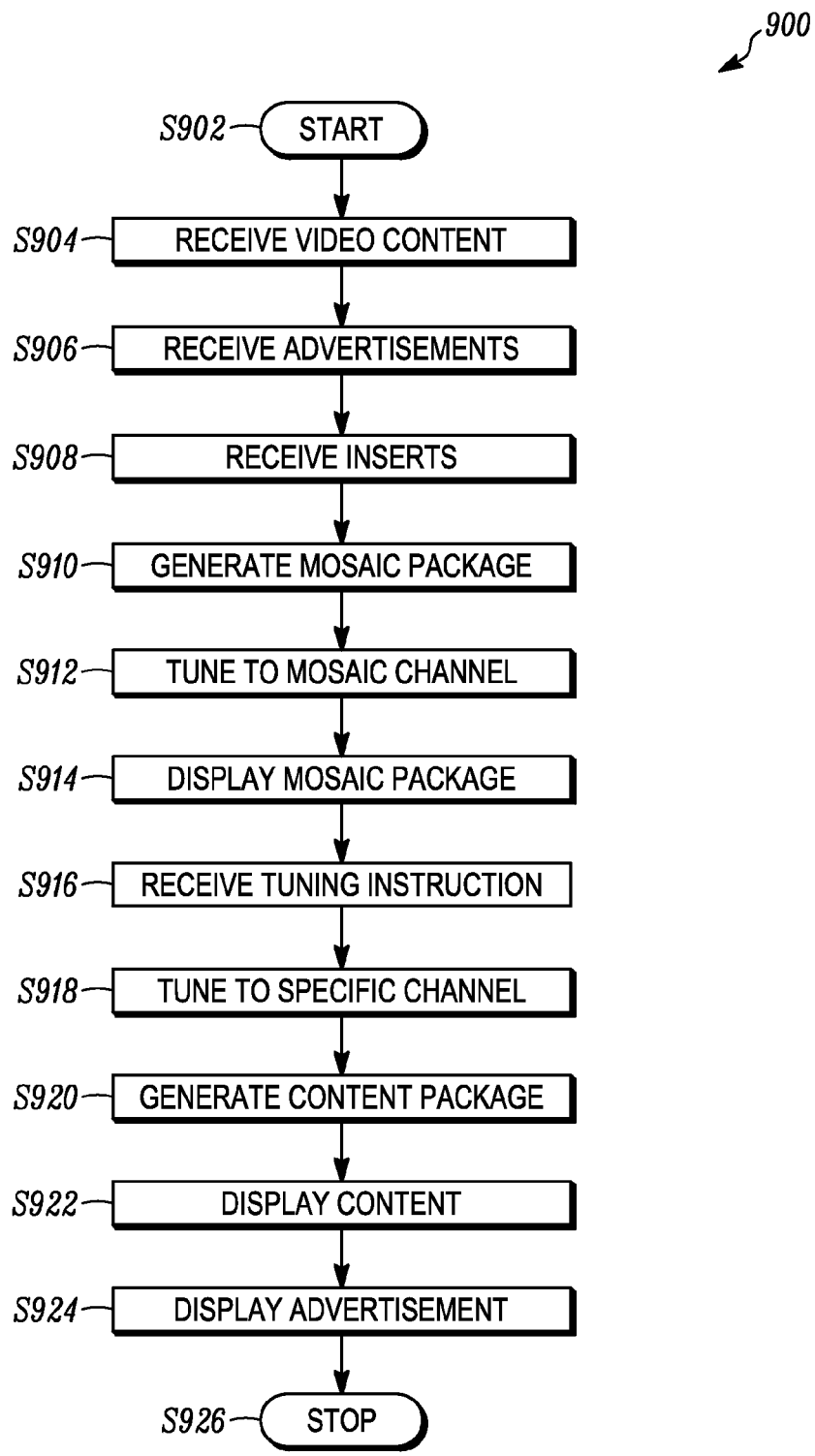
FIG. 9 illustrates a method of displaying content in accordance with aspects of the present invention.

FIG. 9 illustrates a method 900 of displaying content in accordance with aspects of the present invention.

As shown in the figure, method 900 starts (S902) and system 600 receives and stores video content (S904). Referring to FIG. 7, content providers 102 send video data streams to communications component 610, and communications component 610 sends the video data stream to memory 702. Memory 702 then stores the video data stream. Referring to FIG. 8, video content may include the initial, middle, and later portions of content for video data streams 802, 804, 806, and 808.

Figure 1A:
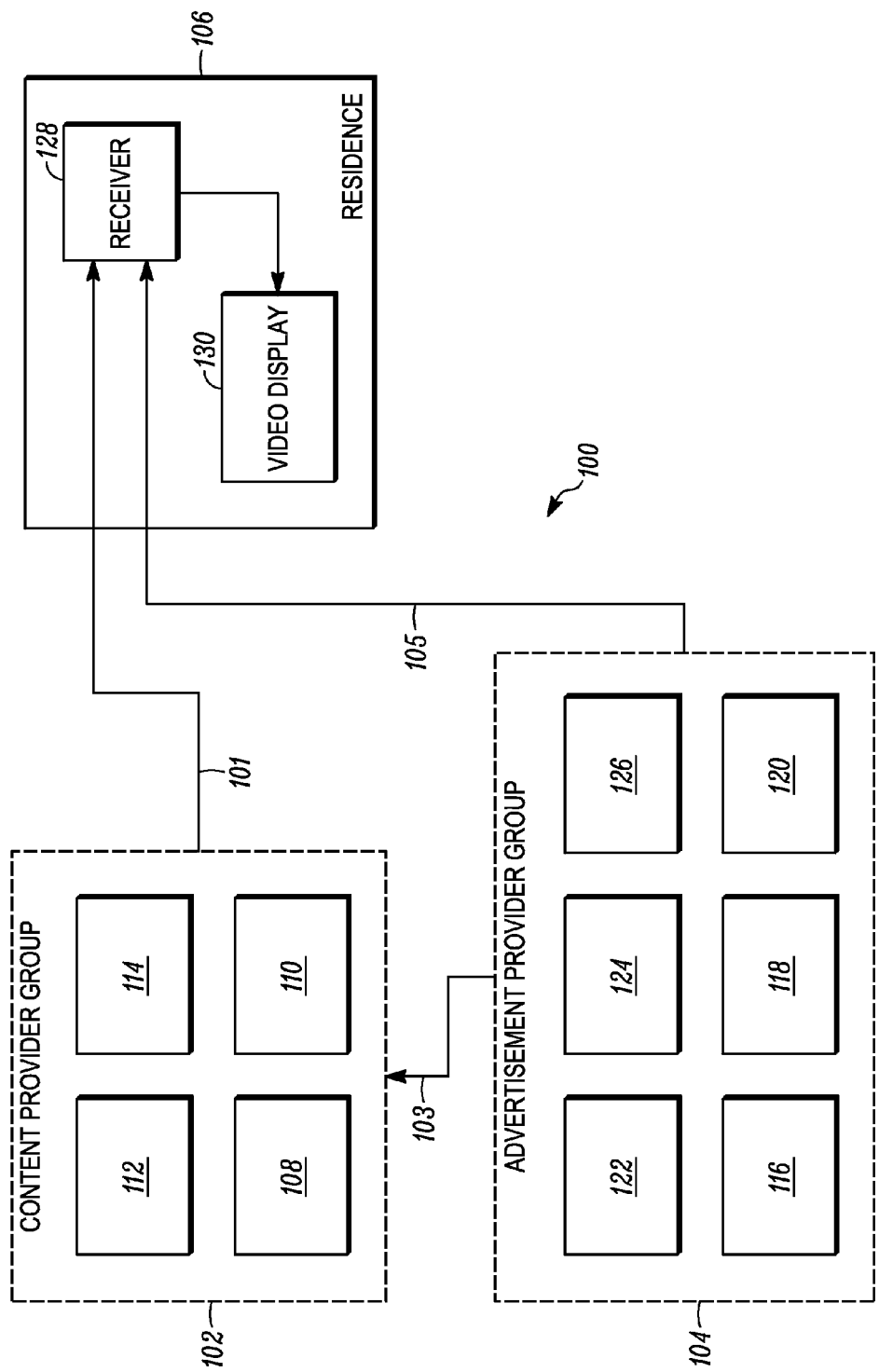
FIG. 1A illustrates a conventional content mosaic.
Figure 1B:
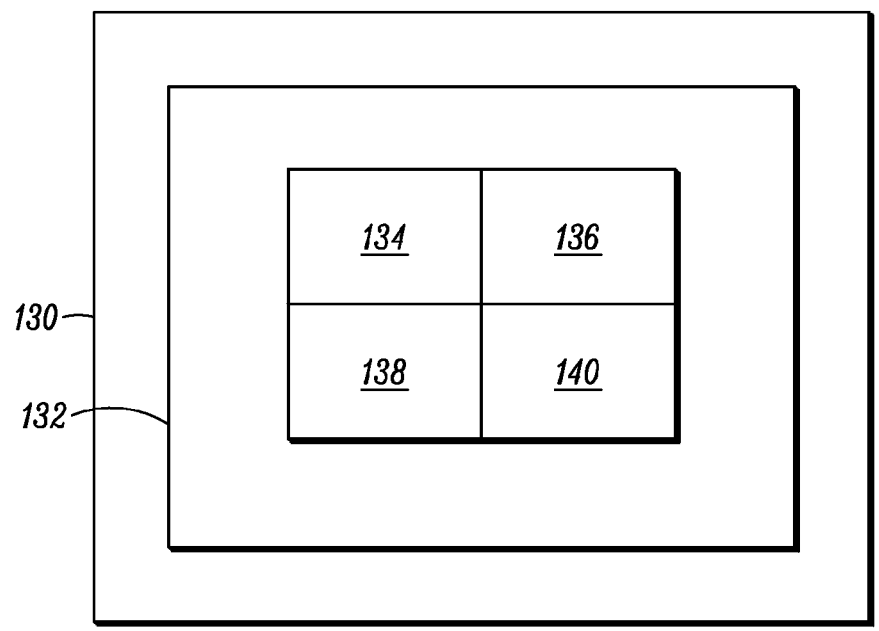
FIG. 1B illustrates a conventional mosaic display.
Figure 1C:
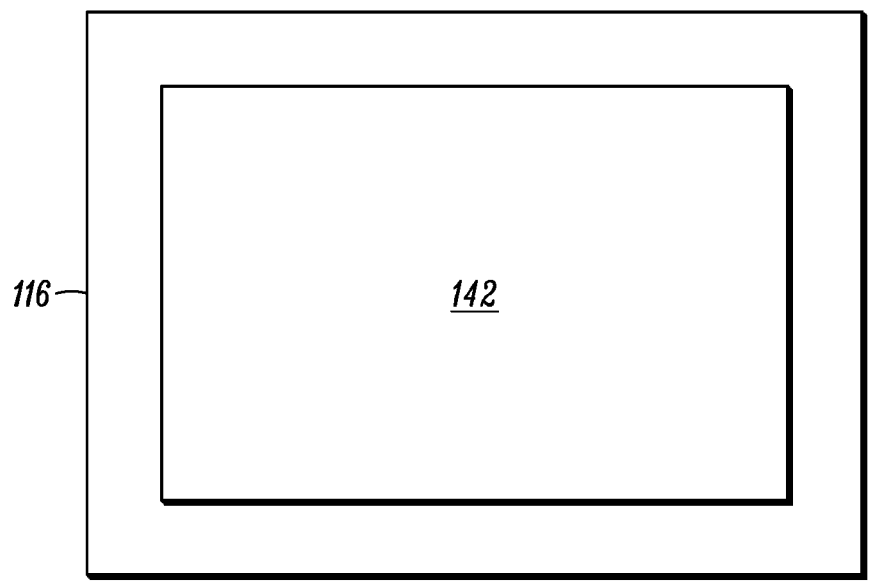
FIG. 1C illustrates a video display after an image is selected from a mosaic display.
Figure 2:
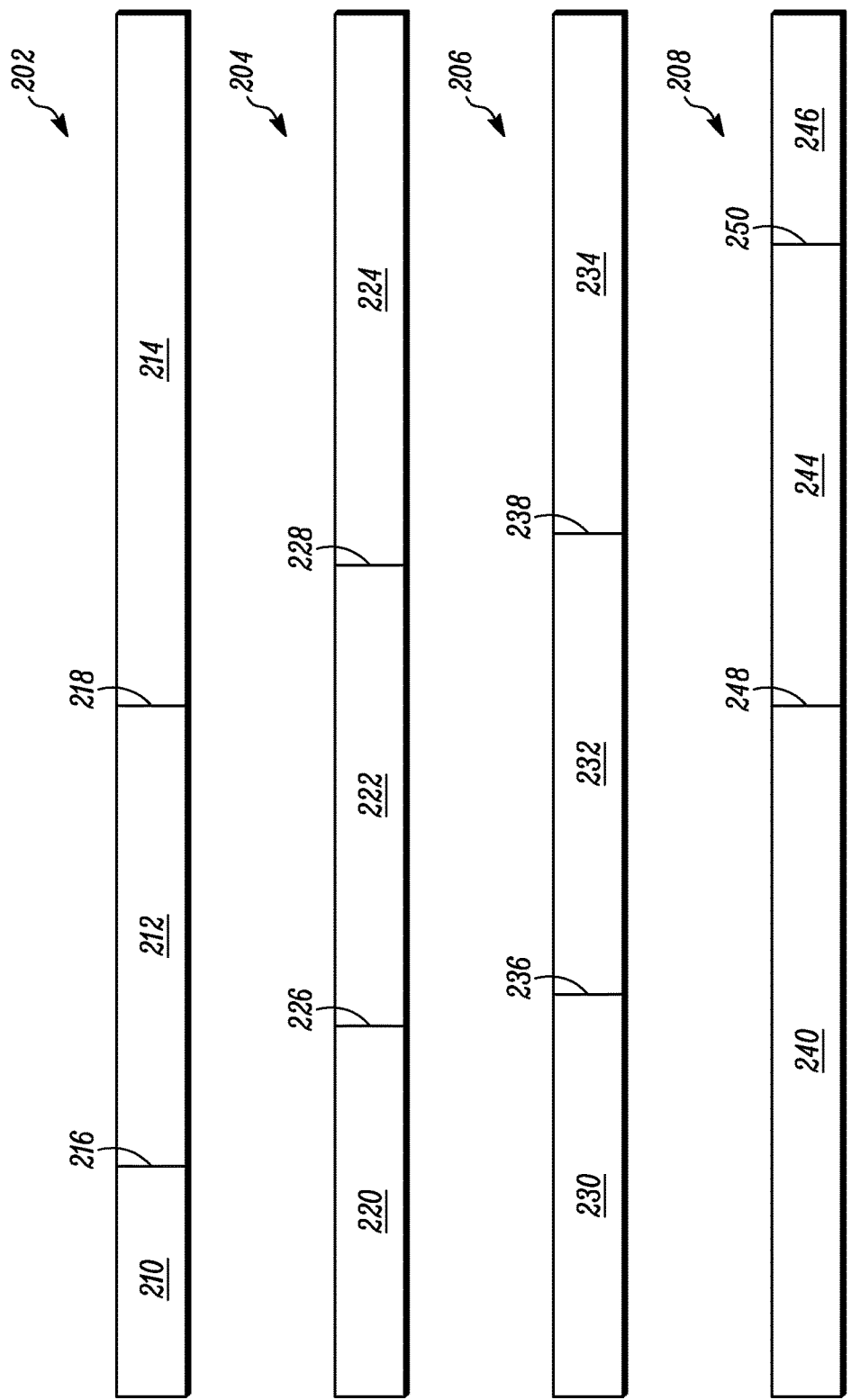
FIG. 2 illustrates streams of video data.
Figure 3:
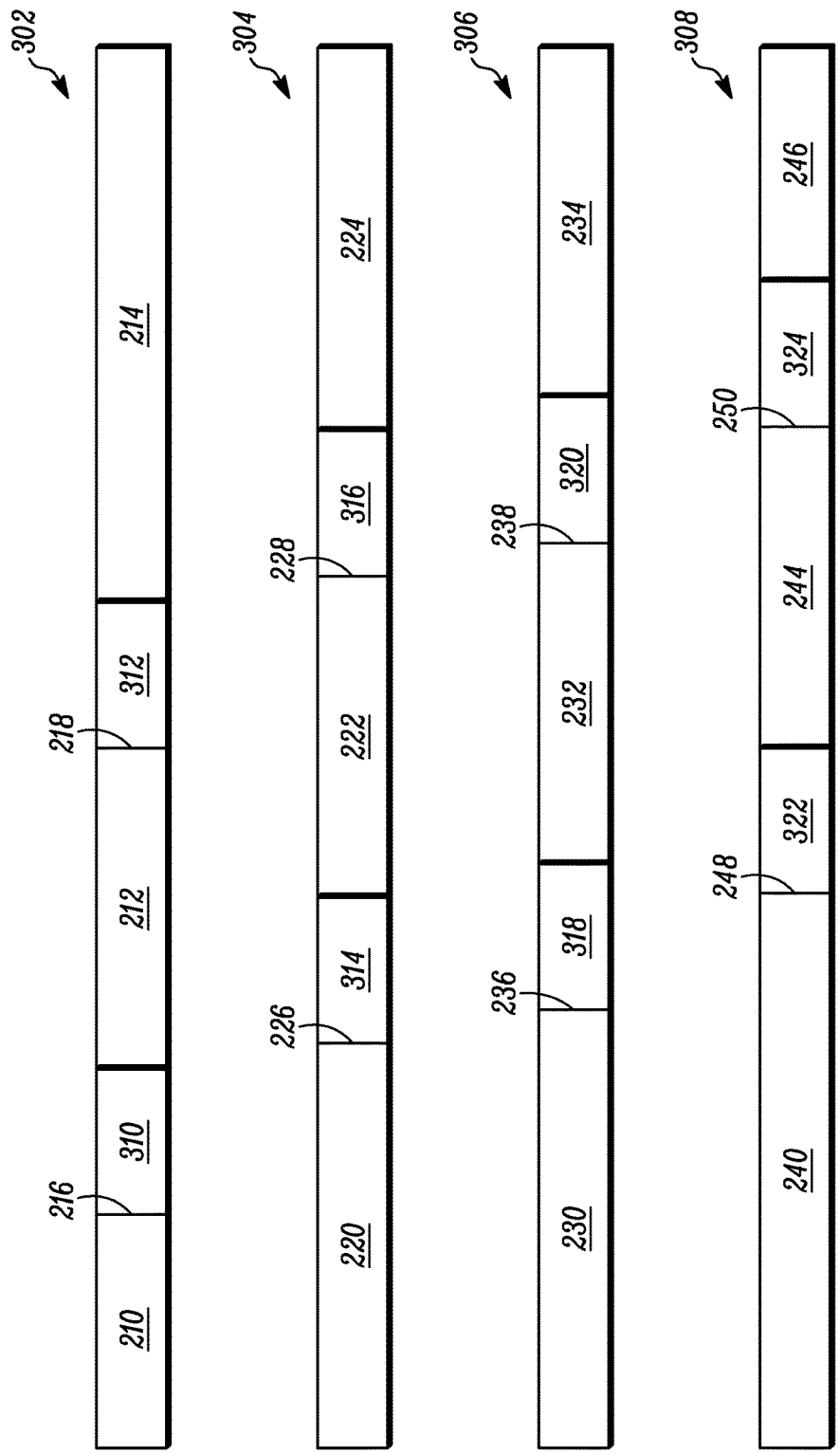
FIG. 3 illustrates streams of video data with advertisements.
Figure 5A:
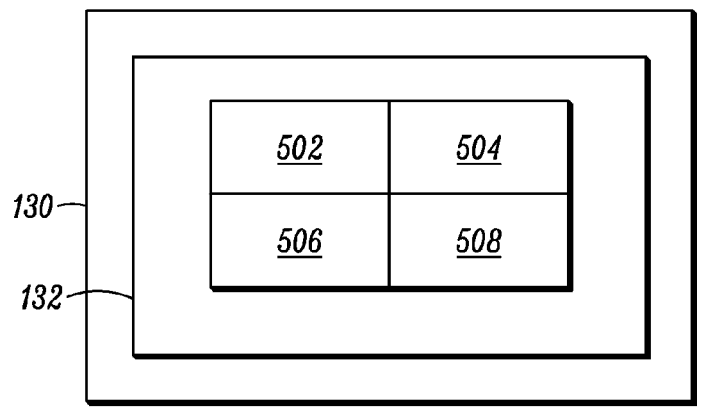
Figure 5B:
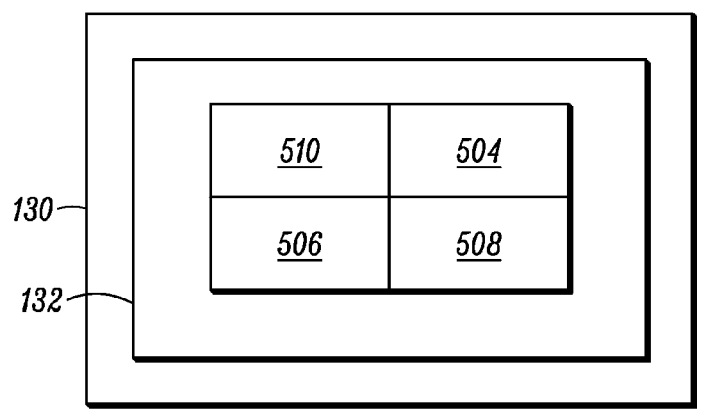
Figure 5C:
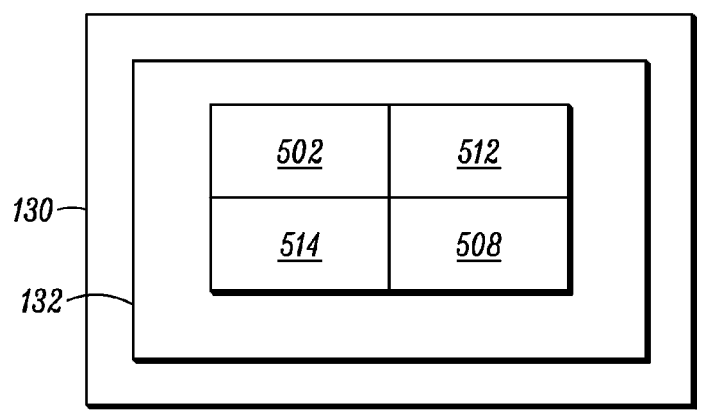

Returning to FIG. 9, system 600 then receives and stores advertisements (S906). Referring to FIG. 7, advertisement providers 104 provide advertisements to communication component 610, and communication component 610 sends the advertisements to memory 702. Memory 702 then stores the advertisement data. Referring to FIG. 3, advertisements may include all advertisements associated with video data stream 202, 204, 206, and 208.

Returning to FIG. 9, it should be noted that in some embodiments, the advertisements are received and stored (S906) prior to the video content being received and stored (S904). Still further, in some embodiments, the video content (S904) and the advertisements (S906) are received and stored at the same time.

System 600 then receives and stores inserts (S908). Referring to FIG. 7, insert providers 604 provide inserts to communication component 610, and communication component 610 sends the insert data to memory 702. Memory 702 then stores the insert data. Referring to FIG. 3, inserts may include all inserts that correspond to all advertisements associated with video data stream 202, 204, 206, and 208.

In should be noted that in some embodiments, the inserts are received and stored (S908) prior to the video content or advertisements being received and stored (S904 or S906). Still further, in some embodiments, the inserts (S908) video content (S904) and the advertisements (S906) are received and stored at the same time.

Returning to FIG. 9, system 600 then generates a mosaic package (S910). Referring to FIG. 7, memory 702 provides packaging component 704 the stored content received from content providers 102, the stored advertisements received from advertisement providers 104, and the stored inserts from insert providers 604.

Referring to FIG. 8, packaging component 704 then creates different content packages for a mosaic display. Using video data stream 802 as an example, packaging component 704 may create package 818 that includes initial portion of content 210, insert 810, and middle portion of content 212. Packaging component may also create package 812 that includes middle portion of content 212, advertisement 312, and later portion of content 214. Packaging component 704 is not limited to creating packages that contain only complete segments of content, advertisements, or inserts. Packaging component 704 may also create packages that start and/or end at any point in the various segments of content, advertisements, or inserts. Creating packages in such a manner may be desired because the viewer may tune to a mosaic display at any time, so packages may be created to correspond with any time a viewer may choose to tune to a mosaic display.

Returning to FIG. 9, the viewer then tunes to a mosaic display (S912). Referring to FIG. 7, the viewer provides an instruction to instruction receiver 708 that he desires to watch a mosaic display. The instruction may be provided to instruction receiver 708 by any conventional method, including using a remote control, or selecting the channel from the set top box. Instruction receiver 708 provides the viewer instructions to packaging component 704 and image processing component 706. Packaging component receives the tuning instruction from instruction receiver 708 and chooses the package that corresponds to the tuning instruction at the time the instruction is received.

Referring to FIG. 8, the viewer may provide the tuning instruction at time $t_1$ to tune to a mosaic display. At time $t_1$, portion of content 210, portion of content 220, portion of content 230, and portion of content 240 are currently being displayed by video data streams 802, 804, 806, and 808, respectively. However, because the viewer may choose to watch mosaic display for some time before making a final decision as to the channel he ultimately chooses to watch, packaging component 704 may choose to provide packages 818, 822, 826, and 830 to image processing component 706. This would serve to prevent the viewer from seeing advertisements 310, 314, 318, and 322 from FIG. 3 and replace them with inserts 810, 812, 814, and 816, respectively.

Referring back to FIG. 9, the viewer is able to view the mosaic display selected (S914). Referring to FIG. 7, image processing component 706 sends content packages 818, 822,

826, and 830 to video display 130 and a mosaic display is shown to the viewer. This will be described with additional reference to FIGS. 10A-10C.

Figure 10A:
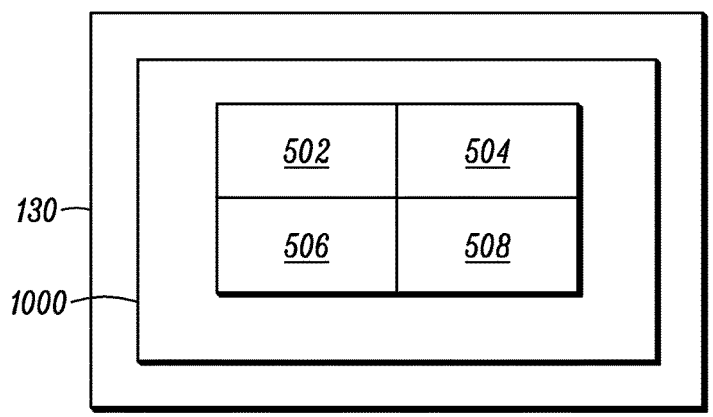
Figure 10B:
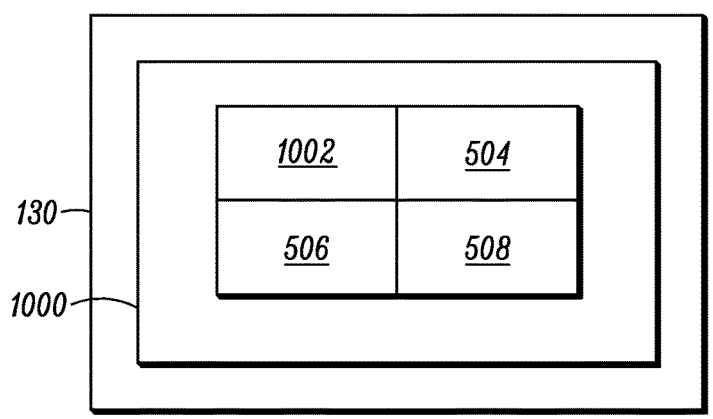
Figure 10C:
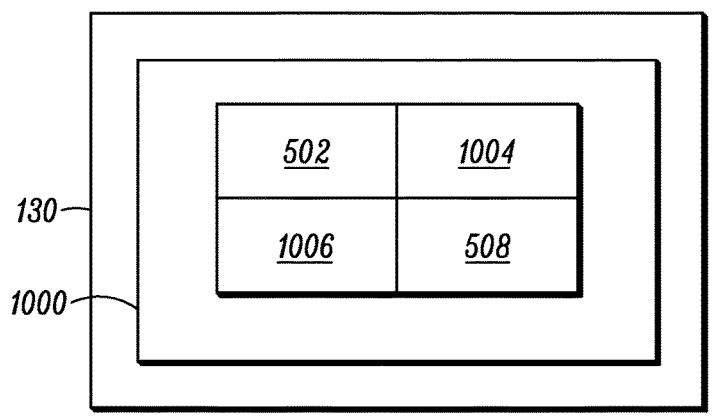

FIGS. 10A-C illustrate mosaic displays in accordance with aspects of the present invention at three different time, respectively, wherein FIG. 10A illustrates a mosaic display 1000 prior to time $t_1$ as illustrated in FIG. 8, FIG. 10B illustrates mosaic display 1000 between times $t_1$ and $t_2$ as illustrated in FIG. 8 and FIG. 10C illustrates mosaic display 1000 between times $t_4$ and $t_5$ as illustrated in FIG. 8.

As shown in FIG. 10A, video display 130 is currently showing mosaic display 1000 for a time prior to time $t_1$. During this period, mosaic display 1000 includes a video image 502, a video image 504, a video image 506 and a video image 508. In this example, with additional reference to FIG. 8, video image 502 corresponds to initial portion of content 210 of video data stream 802, video image 504 corresponds to initial portion of content 220 of video data stream 804, video image 506 corresponds to initial portion of content 230 of video data stream 806 and video image 508 corresponds to initial portion of content 240 of video data stream 808.

In other words, mosaic display 1000, prior to time $t_1$, displays the actual content of the show on each of the channels. In this way, the viewer can easily see what is currently playing on each channel. However, this may change if an advertisement starts to play on one of the channels. Contrary to the conventional system and method discussed above with reference to FIGS. 4-5C, in accordance with aspects of the present invention, a viewer will see content related inserts as opposed to advertisements. In this manner, a viewer will know shows are playing on each channel for each respective video image of the mosaic. This will be described with reference to FIGS. 10B-C.

As shown in FIG. 10B, video display 130 is currently showing mosaic display 1000 for a time between times $t_1$ and $t_2$. During this period, mosaic display 1000 includes a video image 1002, video image 504, video image 506 and video image 508. In this example, with additional reference to FIG. 8, video image 1002 corresponds to insert 810 of video data stream 802.

In other words, mosaic display 1000, between times $t_1$ and $t_2$, displays the actual content of the show on three of the four of the channels, but additionally displays an insert on one of the channels that would otherwise have been displaying an advertisement. Accordingly, the viewer can see what is currently playing on three of the four channels and will additionally know what is playing on the fourth channel, which is currently showing the content-related insert.

As shown in FIG. 10C, video display 130 is currently showing mosaic display 1000 for a time between times $t_4$ and $t_5$. During this period, mosaic display 1000 includes video image 502, a video image 1004, a video image 1006 and video image 508. In this example, with additional reference to FIG. 8, video image 1004 corresponds to insert 814 of video data stream 804 and video image 1006 corresponds to insert 814 of video data stream 806.

In other words, mosaic display 1000, between times $t_4$ and $t_5$, displays the actual content of the show on two of the four of the channels, but additionally displays inserts on the remaining two channels. Accordingly, the viewer can see what is currently playing on two of the four channels and will additionally know what is playing on the other two channels, which are each currently showing an advertisement, which are currently showing the content-related insert.

Referring to FIG. 9, the system then receives a tuning instruction from the viewer to tune to one of the channels displayed on a mosaic display (S916). Referring back to FIG. 8, the user may view mosaic display 800 until $t_2$, when he makes a final decision as to what channel he ultimately wants to watch. At $t_2$, the viewer sees middle portion of content 212, insert 812, insert 814, and portion of fourth content 240. The viewer may decide to tune to the channel associated with video data stream 802, so he selects the corresponding channel on a mosaic display.

Referring now to FIG. 7, instruction receiver 708 receives the tuning instruction from the viewer and provides the instruction to packaging component 704 and image processing component 706. Packaging component receives the tuning instruction from instruction receiver 708 and generates the package that corresponds to the tuning instruction at the time the instruction is received.

Referring to FIG. 9, the receiver tunes to the channel selected (S918). Referring to FIG. 7, image processing component 706 waits to receive the appropriate content package from packaging component 704 before displaying the channel to the viewer.

Referring to FIG. 9, system 600 then generates a content package (S920). Referring back to FIG. 8, packaging component 704 may choose to generate package 812, which includes middle portion of content 212, advertisement 312, and later portion of content 214. Packaging component 704 may choose to generate package 812 because packages 818 and 812 both include middle portion of content 212, so at the exact time the viewer selects channel 802, the package can be switched from package 818 to package 812 with no disruption to the viewer.

Referring back to FIG. 9, the viewer is able to view the channel selected (S922). Referring to FIG. 7, image processing component 706 sends content package 812 to video display 130 and the desired channel is shown to the viewer, starting at $t_2$.

Referring to FIG. 9, after viewing the middle portion of content 212, the viewer sees an advertisement (S924). Referring to FIG. 8, when the viewer is watching video data stream 802 from content package 812, after viewing the middle portion of content 212, the viewer will see advertisement 312 before viewing the later portion of content 214.

Referring back to FIG. 9, method 900 stops (S926).

In the non-limiting example embodiment discussed above with reference to FIGS. 6-10C, content provider group 102 provides content to receiver 618, advertisement provider group 104 provides advertisements to receiver 128 and insert provider group 604 provides inserts to receiver 128. It should be noted that in other examples, advertisement provider group 104 provides the advertisements to content provider group 102 and insert provider group 604 provides the inserts to content provider group 102, which in turn then provides the content, the advertisements and the inserts to receiver 618. In particular, in such cases, advertisement provider group 104 provides the advertisements to content provider group 102 via a communication channel and insert provider group 604 provides the inserts to content provider group 102 via communication channel 603. Content provider group 102 then provides the content, advertisements and inserts to receiver 618 via communication channel 101. The remaining operations are then similarly described as discussed above with reference to FIGS. 7-10C.

In summary, the present invention provides a system and method to allow a viewer to see relevant content on a mosaic display so the viewer can make a decision as to what channel he ultimately wants to watch. While watching the mosaic display, at the time any channel is supposed to show an advertisement, the mosaic display will show alternate content that notifies the user of the content currently being broadcast on that channel. When the user tunes to a specific channel from the mosaic display, the user will then see advertisements at the appropriate times.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device for use with a video display operable to display a video, said device comprising:
    a receiver operable to receive first video data on a first channel and to receive second video data on a second channel, the first video data including an initial portion of first content, an initial first non-program content indicator, a middle portion of the first content, a later first non-program content indicator and a later portion of the first content, the second video data including an initial portion of second content, an initial second non-program content indicator, a middle portion of the second content, a later second non-program content indicator and a later portion of the second content;
    a memory operable to store a first content insert associated with the first content and to store a second content insert associated with the second content;
    a processor that processes code stored in the memory, the processor when processing the code forming processing components comprising:
        a packaging component operable to generate a first content package and a second content package, the first content package including the initial portion of first content, the first content insert and the middle portion of the first content, the second content package including the initial portion of second content, the second content insert and the middle portion of the second content;
        an image processing component operable to output a mosaic which simultaneously displays multiple streams of video data to enable the video display to display the mosaic including a first image section having video associated with the first content package and a second image section having video associated with the second content package together to replace the content of the first video data and the second video data for display; and
        an instruction receiver operable to receive a tuning instruction provided by a viewer viewing the displayed mosaic,
    wherein said packaging component is further operable to generate a primary first content package including the middle portion of the first content, an advertisement at the later first non-program content indicator and the later portion of the first content based on the instruction provided by the viewer,
    wherein said image processing component outputs a primary first content signal in response to the tuning instruction to enable the video display to display a video associated with the middle portion of the first content, the advertisement and the later portion of the first content.

2. The device of claim 1, wherein said receiver is further operable to receive the first content insert on the first channel and to receive the second content insert on the second channel.

3. The device of claim 2, wherein said receiver is further operable to receive the first content insert at a first time and is able to receive the first video data at second time.

4. The device of claim 3, wherein the first time is before the second time.

5. The device of claim 2,
    wherein the first content insert includes a portion of one of the initial portion of first content, the middle portion of the first content and the later portion of the first content, and
    wherein the second content insert includes a portion of one of the initial portion of second content, the middle portion of the second content and the later portion of the second content.

6. The device of claim 1, wherein said receiver is further operable to receive the first content insert at a first time and is able to receive the first video data at second time.

7. The device of claim 6, wherein the first time is before the second time.

8. The device of claim 1,
    wherein the first content insert includes a portion of one of the initial portion of first content, the middle portion of the first content and the later portion of the first content, and
    wherein the second content insert includes a portion of one of the initial portion of second content, the middle portion of the second content and the later portion of the second content.

9. A method of using a video display operable to display a video, said device comprising:
    receiving, via a receiver, first video data on a first channel, the first video data including an initial portion of first content, an initial first non-program content indicator, a middle portion of the first content, a later first non-program content indicator and a later portion of the first content;
    receiving, via the receiver, second video data on a second channel, the second video data including an initial portion of second content, an initial second non-program content indicator, a middle portion of the second content, a later second non-program content indicator and a later portion of the second content;
    storing, via a memory, store a first content insert associated with the first content;
    storing, via the memory, a second content insert associated with the second content;
    generating, via a packaging component provided in a processor, a first content package, the first content package including initial portion of first content, the first content insert and the middle portion of the first content;
    generating, via the packaging component provided in the processor, a second content package, the second content package including the initial portion of second content, the second content insert and the middle portion of the second content;
    outputting, via an image processing component provided in the processor, a mosaic which simultaneously displays multiple streams of video data to enable the video display to display the mosaic including a first image section having video associated with the first content package and a second image section having video associated with the second content package together to replace the content of the first video data and the second video data for display;

receiving, via an instruction receiver, a tuning instruction provided by a viewer viewing the displayed mosaic;

generating, via the packaging component, a primary first content package including the middle portion of the first content, an advertisement at the later first non-program content indicator and the later portion of the first content based on the instruction provided by the viewer; and outputting, via the image processing component, a primary first content signal in response to the tuning instruction to enable the video display to display a video associated with the middle portion of the first content, the advertisement and the later portion of the first content.

10. The method of claim 9, further comprising receiving, via the receiver, the first content insert on the first channel; and receiving, via the receiver, the second content insert on the second channel.

11. The method of claim 10, wherein said receiving, via the receiver, the first content insert on the first channel comprises receiving the first content insert at a first time, and wherein said receiving, via a receiver, first video data on a first channel comprises receiving the first video data at second time.

12. The method of claim 11, wherein the first time is before the second time.

13. The method of claim 10, wherein the first content insert includes a portion of one of the initial portion of first content, the middle portion of the first content and the later portion of the first content, and wherein the second content insert includes a portion of one of the initial portion of second content, the middle portion of the second content and the later portion of the second content.

14. The method of claim 10, wherein said receiving, via the receiver, the first content insert on the first channel comprises receiving the first content insert at a first time, and wherein said receiving, via a receiver, first video data on a first channel comprises receiving the first video data at second time.

15. The method of claim 14, wherein the first time is before the second time.

16. The method of claim 9, wherein the first content insert includes a portion of one of the initial portion of first content, the middle portion of the first content and the later portion of the first content, and wherein the second content insert includes a portion of one of the initial portion of second content, the middle portion of the second content and the later portion of the second content.

* * * * *